United States Patent
Ng et al.

(10) Patent No.: US 7,447,682 B2
(45) Date of Patent: Nov. 4, 2008

(54) FRAMEWORK FOR RETRIEVAL AND DISPLAY OF LARGE RESULT SETS

(75) Inventors: Bernard Ng, Markham (CA); Ramiah Kwok-fai Tin, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 11/109,449

(22) Filed: Apr. 19, 2005

(65) Prior Publication Data

US 2005/0240559 A1 Oct. 27, 2005

(30) Foreign Application Priority Data

Apr. 22, 2004 (CA) ................................ 2465558

(51) Int. Cl.
*G06F 17/30* (2006.01)
(52) U.S. Cl. ................................ 707/3; 707/2; 707/5
(58) Field of Classification Search ................ 707/1–7, 707/10, 100–102, 200
See application file for complete search history.

(56) References Cited

U.S. PATENT DOCUMENTS

| 5,890,151 | A | * | 3/1999 | Agrawal et al. ............. 707/2 |
| 5,926,807 | A | * | 7/1999 | Peltonen et al. ............. 707/3 |
| 6,178,382 | B1 | | 1/2001 | Roederer et al. ............. 702/21 |
| 6,289,395 | B1 | | 9/2001 | Apte et al. ................ 709/318 |
| 6,457,018 | B1 | | 9/2002 | Rubin ..................... 707/103 |
| 6,519,587 | B1 | * | 2/2003 | Blinn et al. ................ 707/3 |
| 6,691,299 | B1 | | 2/2004 | Hart et al. ................ 717/108 |
| 6,907,422 | B1 | * | 6/2005 | Predovic ................... 707/2 |

| 2003/0061249 | A1 | 3/2003 | Ramaswamy et al. ....... 708/136 |
| 2003/0084057 | A1 | 5/2003 | Balogh ..................... 707/100 |
| 2003/0154197 | A1 | 8/2003 | Millet et al. ................ 707/9 |
| 2003/0167377 | A1 | 9/2003 | White ..................... 711/118 |
| 2004/0019593 | A1 | 1/2004 | Borthwick et al. ............ 707/4 |
| 2004/0036719 | A1 | 2/2004 | Van Treeck ................ 345/763 |
| 2005/0216484 | A1 * | 9/2005 | Firebaugh et al. .......... 707/100 |

FOREIGN PATENT DOCUMENTS

EP 0638870 A1 2/1995

OTHER PUBLICATIONS

Natarajan, V. et al. "Handling Large Result Sets in Netscape Application Server" Netscape, Communications Corporation, DevEdge site, pp. 1-6, Mar. 27, 2004.

* cited by examiner

*Primary Examiner*—Don Wong
*Assistant Examiner*—Marc R Filipczyk
(74) *Attorney, Agent, or Firm*—Hamilton & Terrile, LLP; Stephen A. Terrile

(57) ABSTRACT

A computer-implemented technique for managing large results sets returned from a data request for a database. The technique comprises retrieving the primary keys responsive to the data request and sub-setting of the primary keys returned into at least one subset list. The data is then retrieved on a second pass of the database retrieving data from the database using the primary keys of the at least one subset list. Data retrieval is selectively repeated as required until all requested data has been retrieved. The technique is implemented within a framework. The framework comprises an interface defining a desired protocol of behaviour using common methods and an abstraction of the interface implementing the common methods as defined by the interface. Call back methods provide access to the framework by the primary keys.

1 Claim, 4 Drawing Sheets

FRAMEWORK FOR RETRIEVAL AND DISPLAY OF LARGE RESULT SETS

BACKGROUND OF THE INVENTION

1. Field of the Invention

This present invention relates generally to handling large result sets in computer systems. More particularly, the present invention relates to efficiently retrieving and paging through large result sets on a computer system.

2. Description of the Related Art

Many computer applications that are built on top of a database system have to implement techniques to handle large database result sets. Examples of such applications include the retrieval and display of data such as customer orders, catalog entries, user access log, etc. These kinds of data are usually massive and the number of database records could range from a couple of thousands to millions in a small scale business operation.

Different techniques can be employed by a web developer to retrieve data from a database and display them on a web page. For example, one can make Java database connectivity (JDBC) calls directly on a Java server pages (JSP) and manipulate the data using logic coded in the JSP. In a web development project that is built on top of a Java 2 Platform enterprise Edition (J2EE) architecture involving the use of Enterprise Java Beans (EJB), the database access logic will be abstracted in the EJB layer. However, in most of the cases, the data retrieved cannot be displayed directly. To make this data accessible and able to be manipulated, the retrieval and display of the data have to be cursored and paginated (e.g. retrieve and display only 50 records at a time, keep track of the current record position, retrieve and display the next set of results when requested). The need for a framework to unify the process is apparent when the following are considered: (a) the number of different ways to achieve the same results (i.e. retrieval and display of data in a paginated fashion); (b) the difficulties in code maintenance when logic is scattered in JSPs and different helper classes; and (c) minimize coding needed as many functions are common and shareable (for example setPageSize, getTotalListSize, see functions on List-DataBeanInterface described later).

There are typical inefficiencies that can arise when a sub-optimal technique is employed. An example of sub-optimal technique is described next. One technique typically employed in many systems is to retrieve all the records, sort the records appropriately, discard the portions that are not needed, and then only display a small amount of the retrieved data. For example, if there were one million records in the database, one million records would be retrieved, and if the 50th record to the 100th record were of interest, those would be extracted and the remaining records discarded. This process would then be repeated when another set of record was needed. This technique is not very efficient because the process retrieves as many records as there are in the database even though only a very small portion are required at a time.

It would therefore be highly desirable to have a method and software allowing large result sets of data to be retrieved efficiently.

SUMMARY OF THE INVENTION

Having a framework in place minimizes the coding needed and at the same time provides an efficient solution for accessing and manipulating the data. One should be able to provide functions such as pagination of data, navigating from a page to the next or previous page, jumping from a page to another page, displaying the total number of records, and sorting by different attributes with little coding. Those common functions have already been implemented in an AbstractSmart-ListBean class. By having a framework in place and common functions implemented, the following may typically be obtained; unified programming patterns, ease of code maintenance, and code sharing. In addition, having a framework in place enables control of data access and can therefore eliminate much inefficiency that can arise from sub-optimal logic.

The following is a high level description of how data is accessed and pagination done within a framework of an embodiment of the present invention. First retrieve only the primary keys of the database record, and then retrieve the data of interest later using a subset of primary keys. For example, if there are one million customer orders and there is interest in displaying only 40 records starting from the $151^{st}$ record, first get all the required primary keys (first 190 of them, and the records should already be sorted appropriately), then do a subset operation to get the $151^{st}$ to the $190^{th}$, and then get the real data from the database using the extracted primary keys. The technique poses a lot less stress on the database as what are retrieved in the beginning are only the primary keys and in most cases only a portion of them. The actual data is retrieved in the second pass using only the primary keys of interest. The technique can be further enhanced by caching all of the primary keys retrieved from the database the first time. Subsequent access to the database will then be reduced to just the records of interest as the required primary keys can always be subset from the cache.

In one embodiment of the present invention there is provided a computer implemented method for managing large results sets returned from a data request for a database comprising: retrieving primary keys responsive to the data request; sub-setting primary keys returned into at least one subset list; retrieving data from the database using the primary keys of the at least one subset list; and selectively repeating the retrieving as required until all requested data has been retrieved.

In another embodiment of the present invention there is provided a computer system for managing large results sets returned from a data request for a database comprising: a means for retrieving primary keys responsive to the data request; a means for sub-setting primary keys returned into at least one subset list; a means for retrieving data from the database using the primary keys of the at least one subset list; and a means for selectively repeating the retrieving as required until all requested data has been retrieved.

In another embodiment of the present invention there is provided an article of manufacture for directing a data processing system to manage large results sets returned from a data request for a database, the article of manufacture comprising: a computer usable medium embodying one or more instructions executable on the data processing system, the one or more instructions comprising: data processing system executable instructions for retrieving primary keys responsive to the data request; data processing system executable instructions for sub-setting primary keys returned into at least one subset list; data processing system executable instructions for retrieving data from the database using the primary keys of the at least one subset list; and data processing system executable instructions for selectively repeating the retrieving as required until all requested data has been retrieved.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures, which illustrate embodiments of the present invention by example only.

Like reference numerals refer to corresponding components and steps throughout the drawings.

DESCRIPTION OF THE PREFERRED EMBODIMENT

Figure 1:
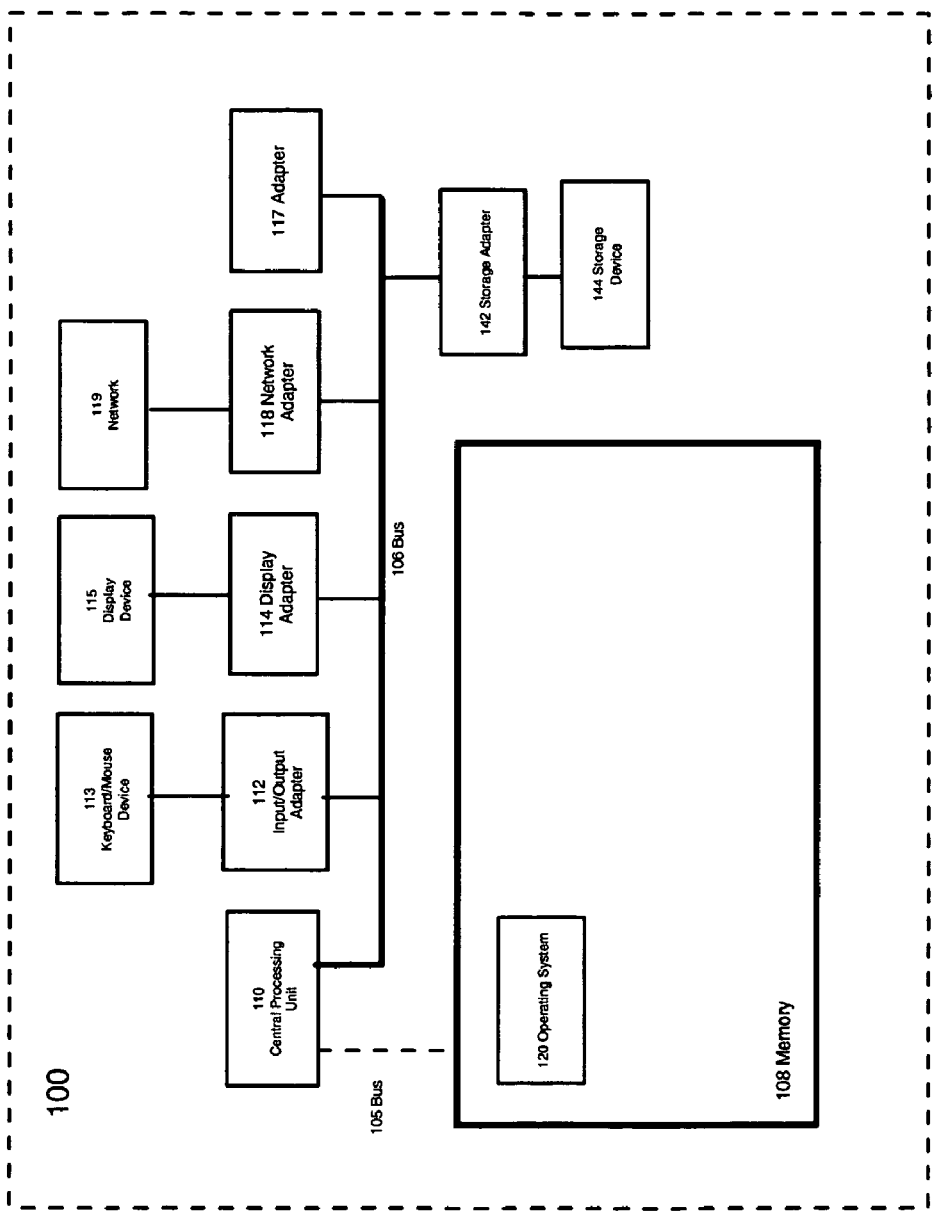
FIG. 1 is a block diagram of a system that may be used in support of an embodiment of the present invention.

FIG. 1 illustrates in a simplified block diagram, a computer system 100 suitable for implementing embodiments of the present invention. The computer system 100 has a central processing unit (CPU) 110, which is a programmable processor for executing programmed instructions, such as instructions contained in memory 108. Memory 108 can also include hard disk, tape or other storage media. While a single CPU is depicted in FIG. 1, it is understood that other forms of computer systems can be used to implement the invention, including multiple CPUs. It is also appreciated that the present invention can be implemented in a distributed computing environment having a plurality of computers communicating via a suitable network 119, such as the Internet.

The CPU 110 is connected to memory 108 either through a dedicated system bus 105 and/or a general system bus 106. Memory 108 can be a random access semiconductor. Memory 108 is depicted conceptually as a single monolithic entity, but it is well known that memory 108 can be arranged in a hierarchy of caches and other memory devices. FIG. 1 illustrates that an operating system 120 may reside in memory 108. Components of an embodiment of the present invention may also reside in memory 108. The operating system 120 provides functions such as device interfaces, memory management, multiple task management, and the like as known in the art. The CPU 110 can be suitably programmed to read, load, and execute instructions of the operating system 120. The computer system 100 has the necessary subsystems and functional components to implement embodiments of the present invention as will be discussed later. Other programs (not shown) include server software applications in which a network adapter 118 interacts with the server software application to enable the computer system 100 to function as a network server via the network 119 as well as to provide data from remote instances supporting embodiments of the present invention.

A general system bus 106 supports transfer of data, commands, and other information between various subsystems of the computer system 100. While shown in simplified form as a single bus, the bus 106 can be structured as multiple buses arranged in hierarchical form. A display adapter 114 supports a video display device 115, which is a cathode-ray tube display or a display based upon other suitable display technology that may be used to depict data. The Input/output adapter 112 supports devices suited for input and output, such as a keyboard or mouse device 113, and a disk drive unit (not shown). A storage adapter 142 supports one or more data storage devices 144, which could include a magnetic hard disk drive or CD-ROM drive although other types of data storage devices can be used, including removable media for storing data.

An adapter 117 is used for operationally connecting many types of peripheral computing devices to the computer system 100 via the bus 106, such as printers, bus adapters, and other computers using one or more protocols including Token Ring, LAN connections, as known in the art. The network adapter provides a physical interface to a suitable network 119, such as the Internet. The network adapter 118 includes a modem that can be connected to a telephone line for accessing the network 119. The computer system 100 can be connected to another network server via a local area network using an appropriate network protocol and the network server can in turn be connected to the Internet. FIG. 1 is intended as an exemplary representation of the computer system 100 by which embodiments of the present invention can be implemented. It is understood that in other computer systems, many variations in system configuration are possible in addition to those mentioned here.

Figure 2:
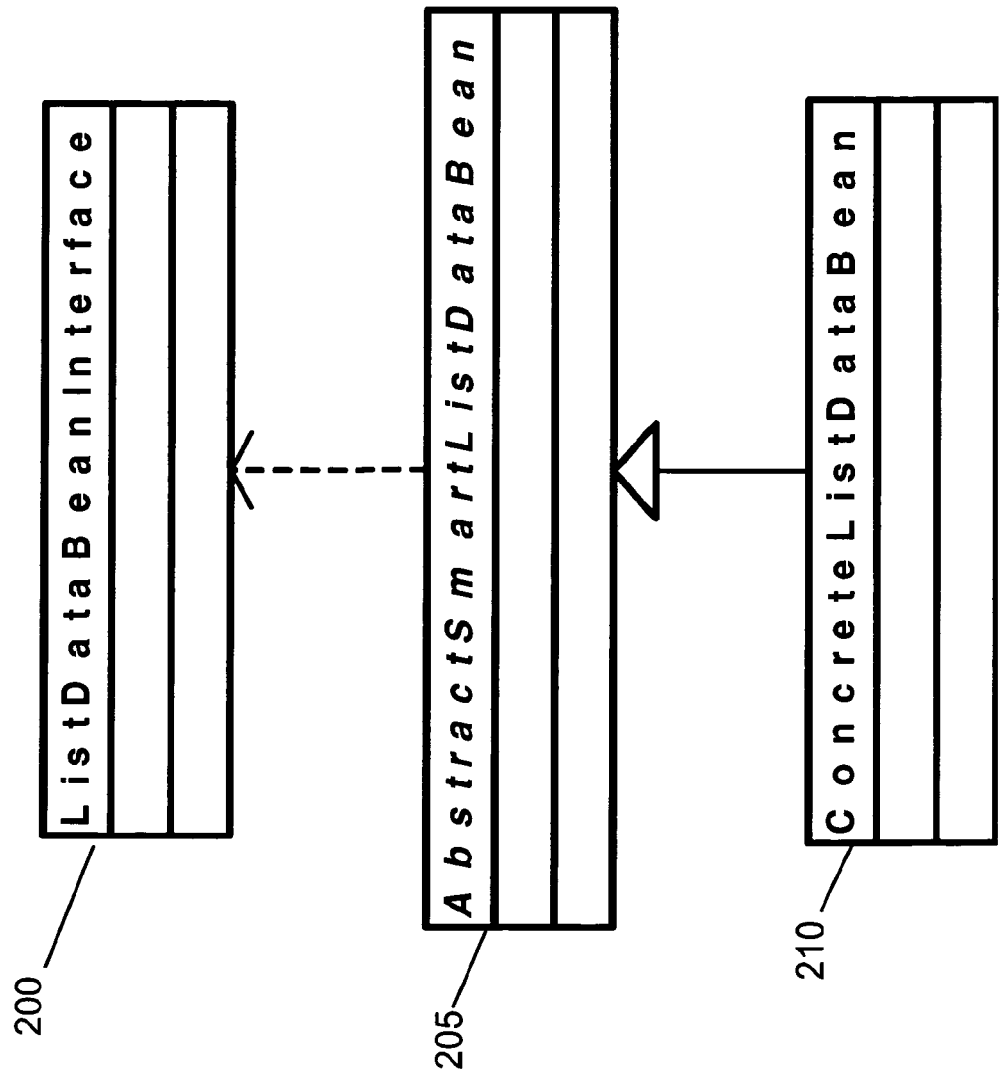
FIG. 2 is a block diagram of a class structure of an embodiment of the present invention.

Our framework involves three main components as depicted in the class structure of FIG. 2. These include an interface referred to as ListDataBeanInterface 200, an abstract class referred to as AbstractSmarttListBean 205, and a concrete class extended from AbstractSmarttListBean by the user, referred to as ConreteListDataBean 210.

The purpose of ListDataBeanInterface 200 is to define a protocol of behavior to be implemented. Methods defined in the class include:

//paging methods
public void setPageSize(int size); //number of records to be returned in a page
public void setStartIndex(int index); //start index of the records to be returned
public void setFullResultSet(boolean trueFalse); //if it is set to true, result set size and start index will not be used. Defaults to false.
public int getTotalListSize( ); //returns the total number of records
public boolean is Empty( ); //returns true if empty
//returns results
public Collection getNextSetOfDataObjects( ); //returns a list of data objects (i.e. databeans in the WebSphere Commerce Architecture)
public Collection getDataObjects( ); //returns all data objects
//sorting methods
public com.ibm.commerce.base.util.SortingAttribute getSortAtt( ); //returns the sorting attribute
public void setSortAttribute(com.ibm.commerce.base.util.SortingAttribute newSortAtt); //sets the sorting attribute AbstractSmartListBean 205 implements ListDataBeanInterface 200 just defined. The purpose of AbstractSmartListBean 205 is to provide the actual implementations for the methods defined in ListDataBeanInterface 200. In addition to providing implementations for those common methods, a number of callback methods are also defined in AbstractSmartListBean 205. The callback methods may be invoked by the framework and thus their implementations must be provided in the concrete class created by the user.

The concrete class extends from AbstractSmartListBean 205 and therefore automatically inherits the methods implemented in AbstractSmartListBean 205. ListDataBeanInterface and AbstractSmartListDataBean will be provided by the framework whereas ConcreteListDataBean represents a class that will be created by a user.

However, before the concrete class can be put into use, a number of callback methods as defined in AbstractSmartList-Bean 205 will have to be implemented. Examples of such callback methods include:

abstract void doPopulate( ) throws Exception; //initialization work is done here abstract Collection doGetPrimaryKeys( ) throws Exception; //returns a list of primary keys for pagination operations abstract Object doGetEJBHome( ) throws Exception; //returns an EJBHome for the data object of interest abstract Object createDataBean(Object accessBean) throws Exception; //creates a databean from an accessbean The callback methods provide a means for the framework to inquire about the concrete class. The framework is a generic implementation and it requires two important pieces of information to be provided by the callback methods to operate. The two pieces of information required are the actual database objects being processed and the identity of each of those objects. The method doGetEJBHome( ) returns an instance of EJB home interface to the framework. For example, if customer order is of interest here, an Order EJB home interface will be returned. Having just an EJB home is not sufficient as what is required is a list of records. For example of the customer order is used as an example here, the order IDs that can uniquely identify each of the database objects are missing. The other method doGetPrimaryKeys( ) provides that information as it returns a list of primary keys to the framework.

Having a framework in place minimizes the coding needed and at the same time provides an efficient solution for accessing and manipulating the data. It may be possible to provide functions such as pagination of data, navigating from a page to the next or previous page, jumping from a page to another page, displaying the total number of records, and sorting by different attributes with little coding.

The following is a high level description of how data is accessed and pagination done within the framework. First retrieve only the primary keys of the database record, and then retrieve the data of interest later using a subset of primary keys. For example, if there are one million customer orders and there is interest in displaying 40 records starting from the 151$^{st}$ record, first get all the required primary keys (first 190 of them, and the records should already be sorted appropriately, support for other than primary key based sorting is also provided and not just limited to the example sort given), then do a subset operation to get the 151$^{st}$ to the 190$^{th}$, and then get the real data from the database using the extracted primary keys. The technique typically poses less stress on the database as what was retrieved in the first pass was only the primary keys, and in most cases only a portion of the primary keys. The actual data is retrieved in the second pass using only the primary keys of interest. The technique can be further enhanced by caching all of the primary keys after they have been retrieved in the first pass from the database. Subsequent access to the database will then be reduced to just the records of interest as the required primary keys can always be subset from the keys in the cache.

The following is a flow of the database access using a proposed embodiment of the present invention. First, fetch all the primary keys. For example, in a customer ordered database, select orderID from custOrders order by memberID. Second, subset the primary keys of interest. For example, if there is only interest in looking at 40 records at a time, extract the first 40 primary keys and use those keys in the next step. The location of the subset is determined by the page size and start index. Third, fetch the real data using primary keys just obtained. For example, select currency, totalvalue, totaltax, lastupdate, description from custOrders where orderID in (the 40 primary keys subset in step 2) order by memberID.

The "order by" clause is determined from the sorting attribute specified. The steps are repeated when another set of results need to be displayed. Step 1 may be eliminated if the primary keys are cached after the first retrieval. A method of caching the primary keys is to store them within the session object, thus eliminating the need to re-execute the first "select" statement when the next set of results is needed. If caching is not available, then step 1 can be made more efficient by limiting the number of primary keys returned. For example, do a "select orderID from custOrders order by memberID fetch first 190 only" if there is interest in looking at only 40 records starting from the 151$^{st}$ record.

Typically the logic described above cannot be performed in a single database query such as that in Structured Query Language (SQL). One reason may be that there is always a need to have access to the total number of records that match the search criteria (different from the number of records returned per page). This value is also important when it is required to show the total number of pages as calculated by the total number of records divided by the page size. Another reason may be that the value of the total number of records with the actual data we need in one SQL query cannot be aggregated because there is an expectation of receiving a data object representing the database table. The data object has already been defined and has fields that map directly to database table columns.

It may be further speculated if a technique involving use of the primary key as an index, and fetching the next 50 records where the primary key is greater than the base index key would be possible. Typically this is not feasible because in most of the cases, the sorting attribute is used to define how the data is to be sorted. The "order-by" clause of the SQL query is generated from the sorting attribute a user provides. Consider a scenario where it is required to fetch a range of the 51$^{st}$ record to the 100th record of customer orders sorted by order values. The primary keys (i.e. orders_id) in this case will be out of order, and thus cannot be used to compare with the base index in a "fetch the next 50 records where the primary key is greater than the base index key" technique.

Figure 3:
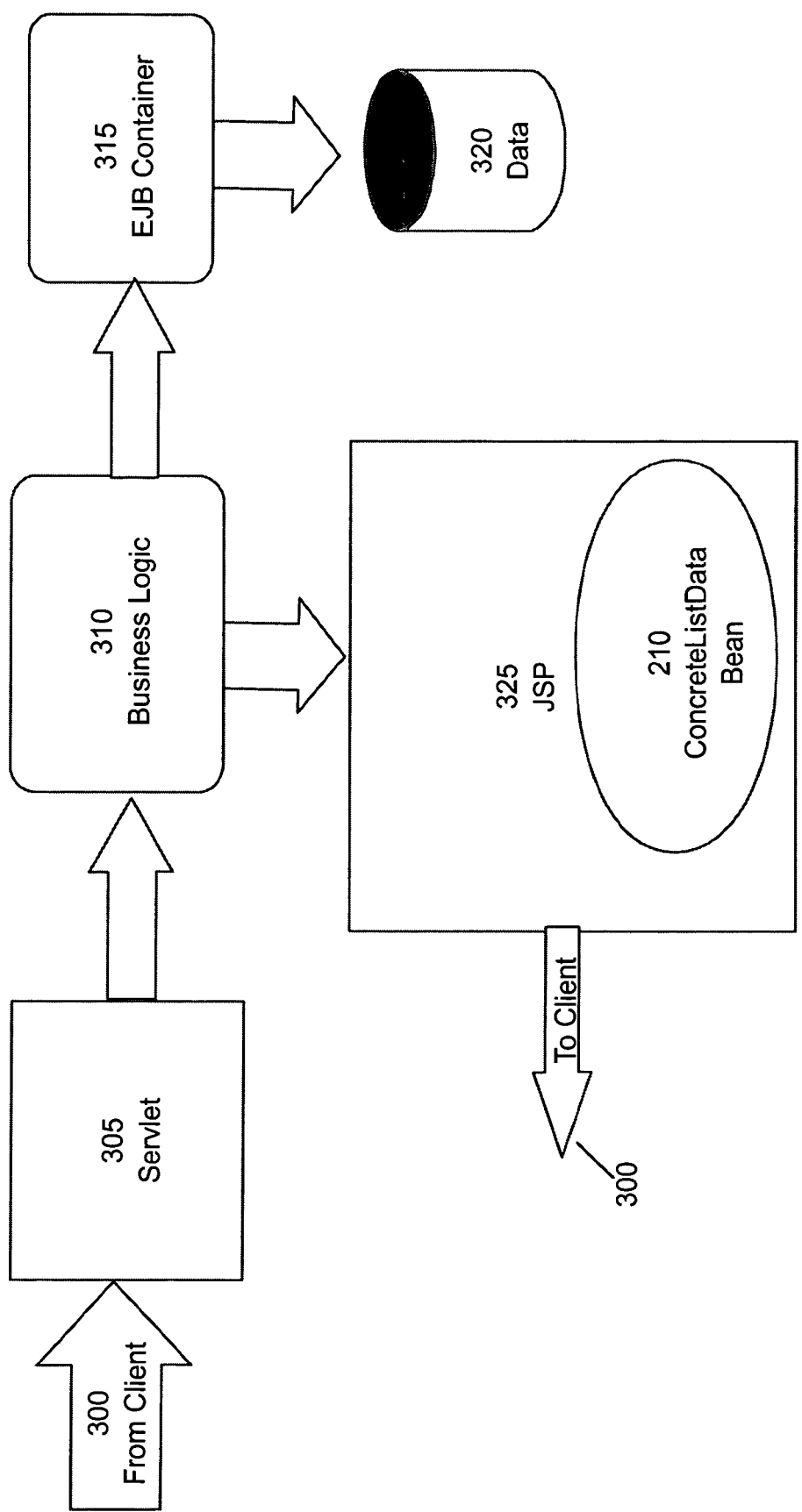
FIG. 3 is a block diagram of possible placement of an embodiment of the present invention of FIG. 2 within a system.

FIG. 3 is a block diagram of a high level view showing where a user created ConcreteListDataBean would reside in a system implementing an embodiment of the present invention. A flow initiates from client 300 and is received by servlet 305. Servlet 305 in turn passes the request along to business logic 310. Business logic has access to EJB container 315 which in turn has database connections for data 320 from which to receive requested data. The requested data will be returned to client 300 by way of business logic 310 formatting the information though JSP 325. JSP 325 contains ConcreteListDataBean 210 to manage presenting the requested data to user client 300.

Figure 4:
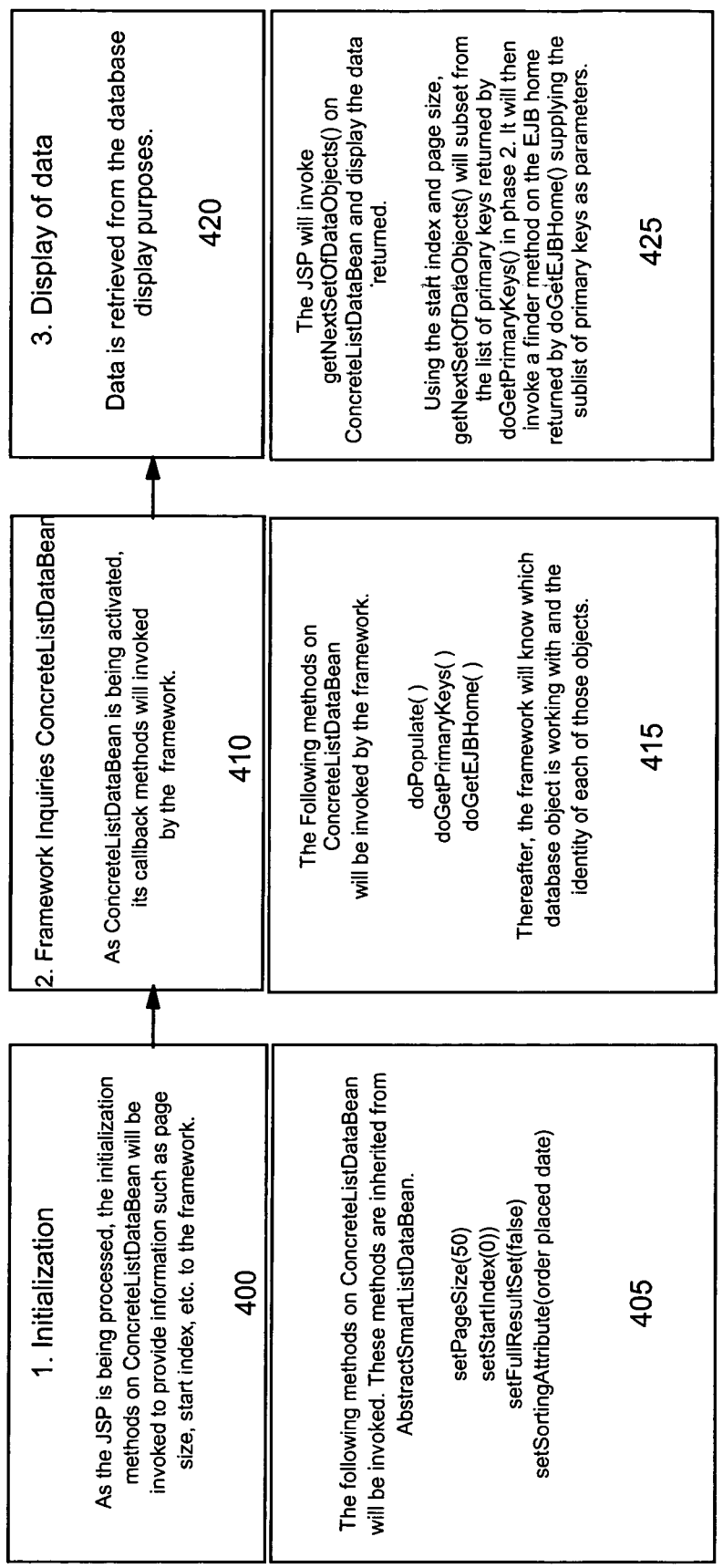
FIG. 4 is a block diagram of the typical flow within the embodiment of FIG. 2.

Further in FIG. 4 is shown in a block diagram the simplified flow involved in operation of an embodiment of the present invention. Beginning in operation 400 is performed the necessary initialization steps. Block 405 shows the typical methods that may be used during operation 400. Moving to operation 410, there is performed the querying of the ConcreteListDataBean 210 to activate the bean and to invoke the callback methods. As seen in block 415 various methods described earlier will be invoked by operation of the framework to establish which database object is being processed and the identity of the object as well. In phase three, the data is actually retrieved from the database during the operation 420. This is accomplished using methods provided in block 425.

It may also be known that connection pooling is used within the embodiments of the present invention a means of operating in a somewhat "disconnected" mode. The connection pooling afforded by the database allows for quick connections to retrieve data when needed without the burden of cursor management using a session object. Connection pooling offers the benefit of fast connection acquisition without the overhead of establishing new connections or maintaining connections or session management.

Although the invention has been described with reference to illustrative embodiments, it is to be understood that the invention is not limited to these precise embodiments. The described embodiments of carrying out the invention are susceptible to many changes and modifications that may be effected therein by one skilled in the art. The invention, rather, is intended to encompass all such change and modification within its scope, as defined by the claims.

We claim:

1. A computer-implemented method for managing large results sets returned from a data request for a database, the computer-implemented method comprising the steps of:

retrieving primary keys responsive to the data request, the primary keys being retrieved on a first pass of the database;

sub-setting the primary keys retrieved into at least one subset list, the primary keys being subset prior to a second pass of the database, the primary keys being cached to include the at least one subset list on a first pass of the database;

retrieving data from the database using the primary keys of the at least one subset list, the retrieving data from the database using the subset list of primary keys on a second pass of the database;

selectively repeating said step of retrieving data as required until all requested data has been retrieved; and implementing the computer-implemented method within a framework comprising
 an interface defining a desired protocol of behaviour using common methods; and
 an abstraction of the interface implementing the common methods as defined by the interface and a plurality of call back methods providing access of the primary keys to the framework.

* * * * *